(12) United States Patent
Lombardo et al.

(10) Patent No.: US 9,260,564 B2
(45) Date of Patent: Feb. 16, 2016

(54) CATALYST FOR NON-ISOCYANATE BASED POLYURETHANE

(71) Applicants: Dow Global Technologies LLC, Midland, MI (US); Northwestern University, Evanston, IL (US)

(72) Inventors: Vincent Lombardo, Wilmette, IL (US); Karl Scheidt, Evanston, IL (US); Emily Leitsch, Evanston, IL (US); John Torkelson, Skokie, IL (US); Elizabeth Dhulst, Chicago, IL (US); William H. Heath, Lake Jackson, TX (US); Nathan Wilmot, Missouri City, TX (US)

(73) Assignees: Dow Global Technologies LLC, Midland, MI (US); Northwestern University, Evanston, IL (US)

( * ) Notice: Subject to any disclaimer, the term of this patent is extended or adjusted under 35 U.S.C. 154(b) by 0 days.

(21) Appl. No.: 14/635,075

(22) Filed: Mar. 2, 2015

(65) Prior Publication Data

US 2015/0247004 A1    Sep. 3, 2015

Related U.S. Application Data

(60) Provisional application No. 61/947,006, filed on Mar. 3, 2014.

(51) Int. Cl.
*C08G 71/04* (2006.01)
*C08F 283/00* (2006.01)
*C08G 75/04* (2006.01)

(52) U.S. Cl.
CPC ............ *C08G 71/04* (2013.01); *C08F 283/006* (2013.01); *C08G 75/04* (2013.01); *C08G 2190/00* (2013.01)

(58) Field of Classification Search
CPC ...... C08F 283/006; C08G 71/04; C08L 75/04
See application file for complete search history.

(56) References Cited

U.S. PATENT DOCUMENTS

| 8,143,346 B2 | 3/2012 | Diakoumakos et al. |
| 2004/0192803 A1 | 9/2004 | Figovsky et al. |

FOREIGN PATENT DOCUMENTS

| EP | 1070733 A1 | 1/2001 |
| JP | 2007-297544 | * 11/2007 |

OTHER PUBLICATIONS

Guan, Industrial & Engineering Chemistry Research, 2011, vol. 50 No. 11, p. 6517-6527.
Tomita, Journal of Polymer Science Part A: Polymer Chemistry, 2001, vol. 39, No. 21, p. 3678-3685.
Ochiai, J. Polym. Sci. Pol. Chem., 2005, vol. 43, No. 24, p. 6282-6286.
Wang, Journal of Polymer Science Part A: Polymer Chemistry, 2002, vol. 40, No. 1, p. 70-75.
Kihara, J. Polym. Sci. Pol. Chem., 1993, vol. 31, No. 11, p. 2765-2773.

* cited by examiner

*Primary Examiner* — Gregory Listvoyb

(57) ABSTRACT

A cooperative catalyst system includes a Lewis acid and a Lewis base for the formation of non-isocyanate based polyurethane using a cyclic carbonate and an amine. A method of forming non-isocyanate based polyurethane includes providing a cyclic carbonate, an amine, and a cooperative catalyst system that has a Lewis acid and a Lewis base.

6 Claims, 4 Drawing Sheets

CATALYST FOR NON-ISOCYANATE BASED POLYURETHANE

FIELD

Embodiments relate to catalysts for use in producing cyclic carbonate-based non-isocyanate polyurethanes and methods thereof.

BACKGROUND

Polyurethane is a highly versatile class of material with a broad array of applications including, e.g., flexible foams, rigid foams, elastomers, and adhesives. Polyurethane may be used in, e.g., furniture, coatings, construction, biomedical applications, etc. Polyurethane is commonly formed by the reaction of a multifunctional isocyanate with a polyol. However, due to regulatory concerns associated with the use of isocyanates, non-isocyanate based formulations for forming polyurethanes are sought.

SUMMARY

Embodiments may be realized by providing a cooperative catalyst system that includes a Lewis acid and a Lewis base for the formation of non-isocyanate based polyurethane using a cyclic carbonate and an amine.

Embodiments may also be realized by providing a method of forming non-isocyanate based polyurethane that includes the use of a cyclic carbonate, an amine, and a cooperative catalyst system that has a Lewis acid and a Lewis base.

BRIEF DESCRIPTION OF THE DRAWINGS

FIG. 5A illustrates a temperature range between −100° C. and 150° C. and FIG. 5B illustrates a magnification of the temperature range from −60° C. to approximately 0° C.

DETAILED DESCRIPTION

Figure 1:
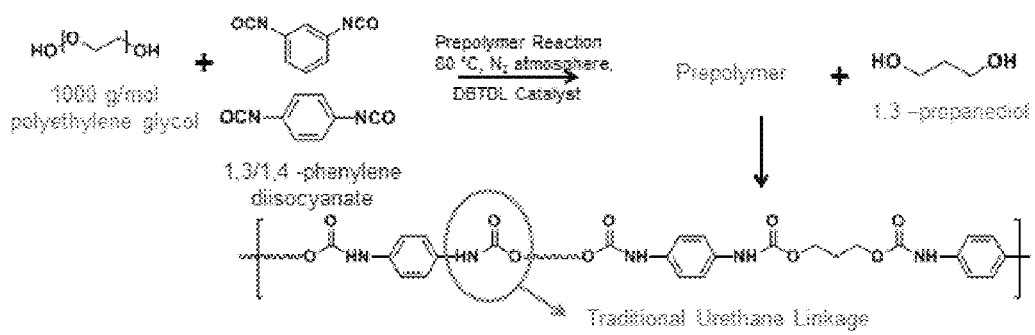
FIG. 1 illustrates a schematic of a method of forming a polyurethane elastomer that is based on isocyanate chemistry.
Figure 2:
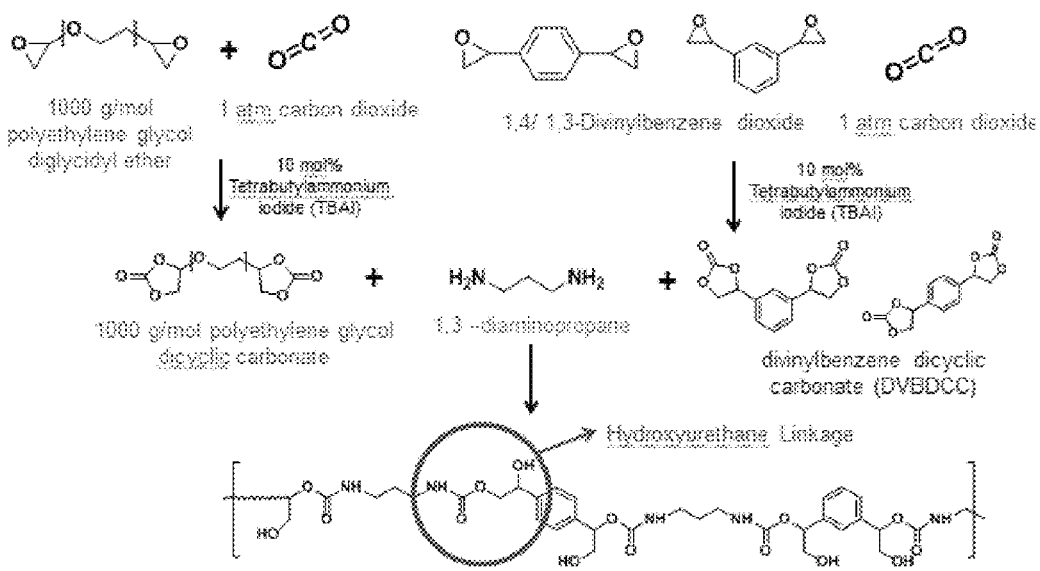
FIG. 2 illustrates a schematic of a method of forming a polyhydroxyurethane elastomer that is based on non-isocyanate chemistry.

Typically, polyurethanes have a urethane linkage that is formed with isocyanate moieties, e.g., see FIG. 1 for an exemplary schematic for forming a polyurethane elastomer using a polyisocyanate and a polyol. Non-isocyanate based polyurethanes have a urethane linkage that is formed in the absence of isocyanate moieties, which linkages may be structurally similar to isocyanate base urethane linkages with the exception of an adjacent primary or secondary hydroxyl group. Referring to FIG. 2, non-isocyanate based polyurethanes may be formed using a cyclic carbonate component (e.g., that consists essentially of at least one cyclic carbonate) and an amine component (e.g., that consists essentially of at least one amine such as a diamine). The cyclic carbonate component and the amine component may be used in an amount of at least one molar equivalent of the cyclic carbonate to one molar equivalent of amine reactive groups. An exemplary non-isocyanate based polyurethane includes the reaction of a five-membered cyclic carbonate component with the amine component resulting in the formation of a hydroxyl carbamate. The hydroxyl carbamate formulation includes a urethane linkage with an additional hydroxyl group, which resultant non-isocyanate based polyurethane is also referred to as a polyhydroxyurethane.

There is a demand for non-isocyanate polyurethanes (e.g., for use as elastomers) because of advantages in, e.g., intermolecular hydrogen bonding, comparable physical properties of isocyanate based polyurethane, and/or increased chemical stability. These properties give non-isocyanate based polyurethanes numerous potential applications, such as chemical-resistant coatings and sealants. Further, cyclic carbonates are considered as an alternative to isocyanates, e.g., because of the potentially ease of synthesis from abundant and inexpensive glycidyls/bis-oxiranes. However, the aminolysis of cyclic carbonates (e.g., of the five-membered ring of the cyclic carbonates) has poor ambient temperature reactivity and reaction times could take many days. In particular, five-membered cyclic carbonates lack the inherent high reactivity levels of isocyanates. Accordingly, when using cyclic carbonates, rapid and effective ambient temperature reactions comparable to those found in isocyanate based polyurethane synthesis are sought. Embodiments improve aminolysis times from days to hours to minutes.

Reactivity and/or reaction times for forming non-isocyanate based polyurethane using cyclic carbonates may be improved by performing a cyclic carbonate ring opening using an oxophilic Lewis acid in conjunction with an organic Lewis base. The Lewis acid and the Lewis base together form a cooperative catalyst system for the formation of the non-isocyanate based polyurethane. The Lewis acid and the Lewis base may work together (e.g., may simultaneously work together) to activate the electrophile (i.e., the carbonate) and the nucleophile (i.e., the amine).

The molar amounts of the Lewis acid and Lewis base are based on the molar amount of the amine component used to form the non-isocyanate based polyurethane. For example, the Lewis acid may be present in an amount from 1 mol % to 50 mol % (whereas mol % is based on the total moles of the Lewis acid per the total moles of the amine functional groups), e.g., the amount may be from 5 mol % to 45 mol %, 5 mol % to 35 mol %, 5 mol % to 30 mol %, 7 mol % to 25 mol %, 7 mol % to 20 mol %, 7 mol % to 15 mol %, etc. The Lewis base may be present in an amount from 1 mol % to 60 mol % (whereas mol % is based on the total moles of the Lewis base per the total moles of the amine functional groups), e.g., that amount may be from 5 mol % to 50 mol %, 5 mol % to 45 mol %, 5 mol % to 30 mol %, 7 mol % to 25 mol %, 7 mol % to 20 mol %, 7 mol % to 15 mol %, etc. According to an exemplary embodiment, the amount of the Lewis acid and the Lewis base used may be minimized, in an effort to reduce the cost of manufacturing the non-isocyanate based polyurethane, while still reducing the reaction time for obtaining a foam product. For example, the Lewis acid and the Lewis base may reduce the reaction time for obtaining at least 99% conversion to a component having a urethane linkage. The measure of >99% conversion of may be used as a metric for model compounds, but 99% conversion may not be needed for polymer systems. For example, for polymer systems a reaction rate may be an appropriate measure.

The molar amount of the Lewis acid used may be the same as or less than the molar amount of the Lewis base used. For example, the Lewis acid and the Lewis base may be the same and each may be present in the amount of 10 mol %, 15 mol %, 16 mol %, 17 mol %, 18 mol %, 19 mol %, 20 mol %, 21 mol %, 22 mol %, 23 mol %, 24 mol %, or 25 mol % (whereas mol % is based on the total moles of the Lewis base per the total moles of the amine functional groups).

The Lewis acid may be a lithium salt, e.g., a lithium salt that includes fluorine, oxygen, and/or sulfur. For example, the lithium salt may include lithium triflate (also referred to as LiOTf), as shown below:

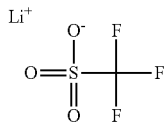

Other exemplary lithium salts include $LiBF_4$, $LiSbF_6$, $LiPF_6$, LiCl, and LiOAc.

The Lewis base may be a cyclic amidine and/or a cyclic guanidine. The amine may include 1,8-diazabycycloundec-7-ene (also referred to as DBU) and/or triazabicyclodecene (also referred to as TBD). For example, TBD may have the following structure:

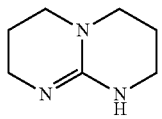

Other exemplary Lewis bases have one of the following structures:

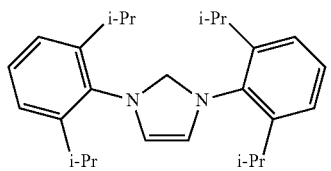

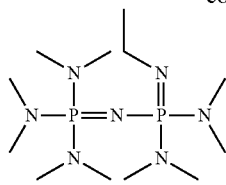

The cyclic carbonate may include at least one five-membered cyclic carbonate. For example, in an exemplary embodiment of demonstrating a polymer forming system the cyclic carbonate may be 4-((benzyloxy)methyl)-1,3-dioxolan-2-one. Other additives on the ether (e.g., in place of the benzyl or phenyl group an aliphatic functionality may be used) that could be useful may be used in the polymer forming system. According to an exemplary embodiment, the non-isocyanate based polyurethane may be formed by reacting Component 1 (a cyclic carbonate) and Component 2 (an amine), in the presence of the cooperative catalyst component including the Lewis acid and base, to form Component 3—a non-isocyanate based urethane linkage (also referred to as a carbamate), as shown below:

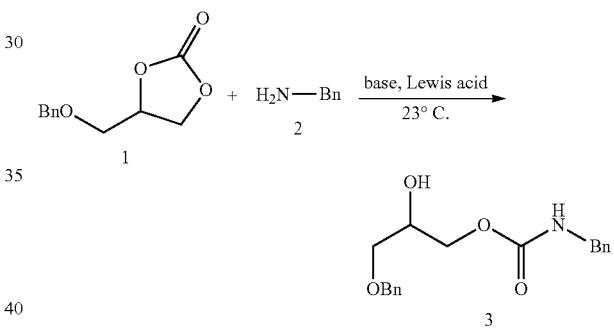

When the cyclic carbonate includes two or more five-membered cyclic carbonates, the cyclic carbonates may be separated by an R group that includes an aliphatic group and/or an aromatic group.

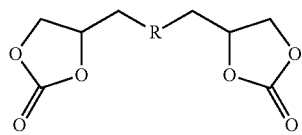

For example, the R group may be a linear or branched and substituted or non-substituted alkyl group, a linear or branched and substituted or non-substituted alkene group, a linear or branch and substituted or non-substituted alkyne group, a linear or branched and substituted or non-substituted alkoxy group, substituted or non-substituted cyclic alkanes, and/or a substituted or non-substituted phenyl group. Exemplary structures for a bis-cyclic carbonate include the following:

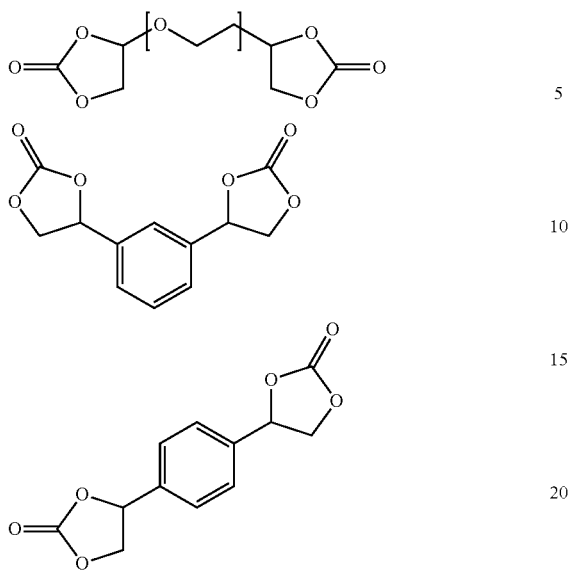

The non-isocyanate based polyurethane may be formed using a bis-cyclic carbonate (e.g., which bis-cyclic carbonate may be formed by reacting a bis-oxirane with carbon dioxide), as shown below:

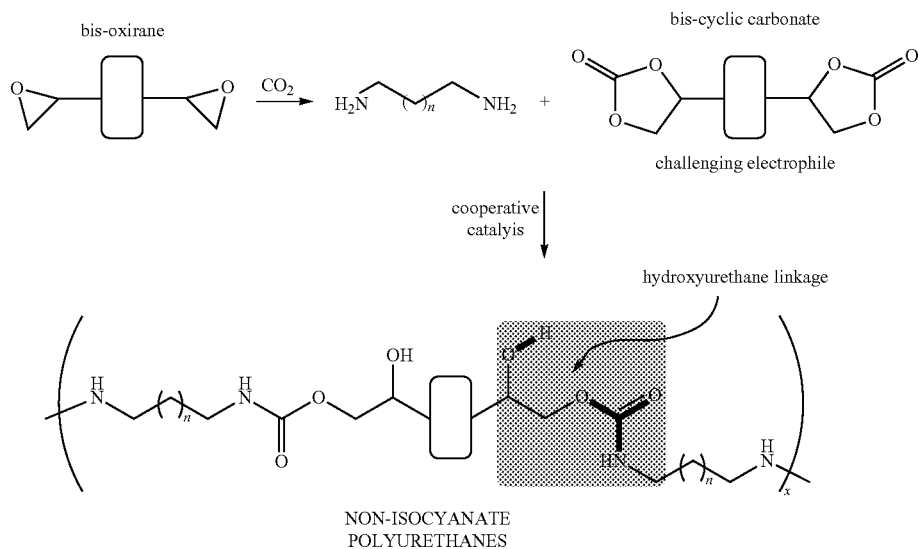

Without intending to be bound by this theory, the use of the cooperative catalysis may include at least the following two cycles: (1) carbonate activation, and (2) amine activation. For example, when using LiOTf as a Lewis acid and TBD as a Lewis base, the following cycles may be realized:

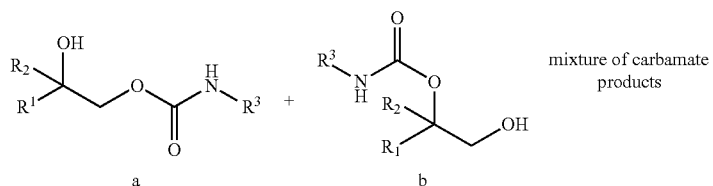

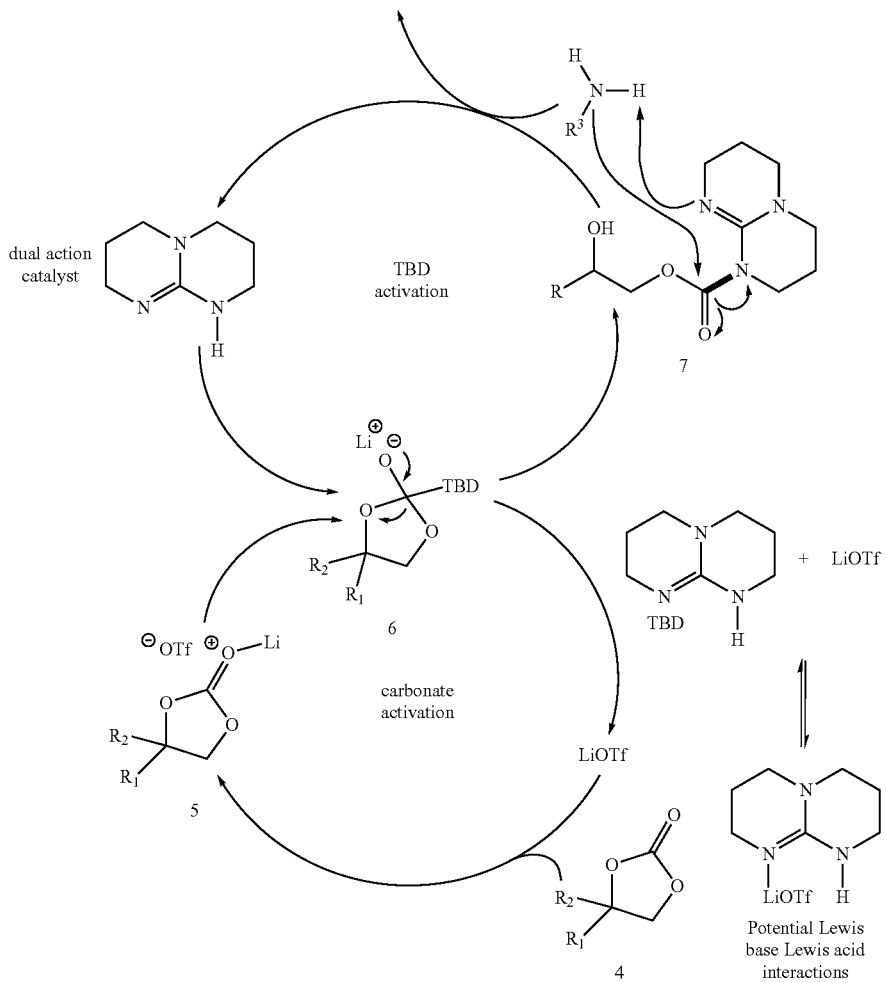

In the above, $R^1$, $R^2$, and $R^3$ may each independently be one of hydrogen, an aliphatic hydrocarbon, or an aromatic hydrocarbon. For example, $R^1$, $R^2$, and $R^3$ may each independently be a linear or branched and substituted or non-substituted alkyl group, a phenyl group, a polyether (polypropylene oxide, polyethylene oxide, polybutylene oxide, and/or copolymers of these, having a number average molecular weight from 100 g/mol to 10,000 g/mol), and/or acrylic polyol. $R^1$, $R^2$, and $R^3$ may each independently have from 1 to 10 carbon atoms (i.e., may independently be C1 to C10 groups).

The impact on the ring opening of cyclic carbonates, e.g., by the combination of TBD and LiOTf, indicates that the Lewis acid and Lewis base work cooperatively as catalysts in the formation of the non-isocyanate based polyurethane. Without intending to be bound by this theory, the lithium triflate may increase the electrophilicity of the cyclic carbonate by forming a Lewis acid activated cyclic carbonate, which may then be attacked by TBD forming a tetrahedral intermediate. This may be followed by a collapse to the activated carbamate. Nucleophilic attack of the activated carbamate by an amine and subsequent deprotonation of the amine by TBD, may generate a mixture of carbamate a and b products and release TBD for further cyclic carbonate ring opening, as shown in the diagram above. Whether carbamate a and/or b is formed depends on where the cyclic structure of the carbonate is opened. Both carbamate a and b may be used to for the non-isocyanate based polyurethane.

Various combinations of substrates of the cyclic carbonate, amine, lithium salts, and/or organic bases may be used in the formation of the non-isocyanate based polyurethane. For example, while exemplary embodiments include the following:

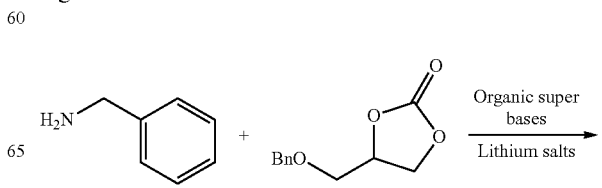

-continued

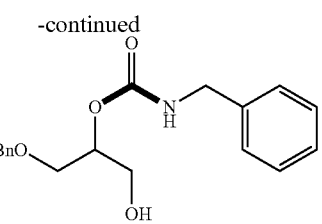

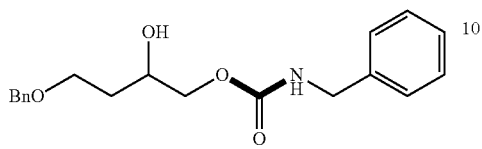

Lithium Salts: LiOTf, LiBF4, LiSbF6, LiPF6, LiCl, LiOAc
Organic super bases:

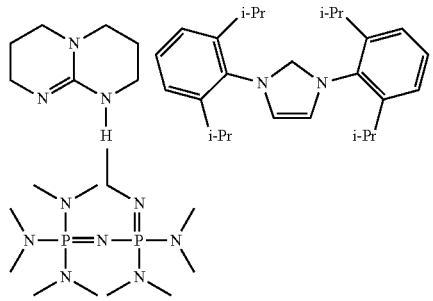

For example, the substrate of the cyclic carbonate may be a hydrocarbon that includes from five carbons to ten carbons (e.g., the substrate may be Bn—benzyl, cyclohexane, or hexane). According to an exemplary embodiment, relatively higher electropositive amines and relatively higher electronegative carbonates may be used to improve reaction kinetics.

According to an exemplary embodiment, the cyclic carbonate may be provided as a cyclic carbonate capped prepolymer, similar to polyurethane chemistry that may use an isocyanate capped prepolymer. For example, the cyclic carbonate capped prepolymer may be formed by reacting a polyol with glycerol carbonate. Thereafter, the prepolymer may be reacted with an amine to form the non-isocyanate based polyurethane.

According to an exemplary embodiment, a relatively faster opening of cyclic carbonates may be realized by using a cooperative catalysis system that includes a Lewis acid such as LiOTf and a Lewis base such as TBD. These conditions may be applicable to a variety of carbonates and amines offering rapid reaction times. For example, as discussed in the Examples, the cooperative catalyst system may be applied to prepolymer synthesis (e.g., a high aminolysis conversion of a pre-polymer cyclic carbonate system with diamines at ambient temperature may be realized). The products of this system offer material properties that may be consistent with isocyanate based polyurethane characteristics.

With respect to the non-isocyanate based polyurethanes, inclusion of hydroxyl groups may inhibit phase separation and contribute to the evolution of elastomeric character (e.g., high modulus and negligible strain at break). The inclusion of cooperative catalyst system may improve the resulting properties of the polyhydroxyurethane. Further, segments of polyhydroxyurethane may be selected to promote phase separation. For example, soft segment and higher molecular weight and/or less polar, more rigid chain extender, and/or order of reactant addition. Further characterize phase separation may be realized using other techniques such as employing a polypropylene glycol based soft segment and/or increase the hard segment content of the polyhydroxyurethane.

Herein, all parts and percentages are based on moles unless otherwise indicated. All molecular weight/equivalent weight values are based on number average, unless otherwise indicated.

EXAMPLES

The following materials are principally used:
LiOTf A lithium trifluoromethanesulfonate (available from Sigma-Aldrich)
DBU A 1,8-diazabycycloundec-7-ene base (available from Sigma-Aldrich)
TBU A triazabicyclodecene base (available from Sigma-Aldrich)
With respect to the below, the reactions are carried out under a nitrogen atmosphere in oven-dried glassware with magnetic stirring. Tetrahydrofuran is purified by passage through a bed of activated alumina. Reagents are purified prior to use, unless otherwise stated, following the guidelines of Perrin and Armarego. Purification of reaction products is carried out by flash chromatography using EM Reagent or Silicycle silica gel 60 (230-400 mesh).

Varied Cooperative Catalyst Systems

Firstly, different cooperative catalyst systems are tested using the Carbonate and Amine shown below:

Carbonate A cyclic carbonate having the following Formula 1:

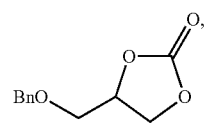

Formula 1 wherein Bn=Benzyl
Amine An amine having the following Formula 2:

 Formula 2, wherein Bn=Benzyl
Referring to Table 1, below, the Carbonate is reacted with the Amine at a temperature of 23° C. in the presence of a catalyst system according to the formulations in Table 1. The resultant non-isocyanate based polyurethane has the following Formula 3:

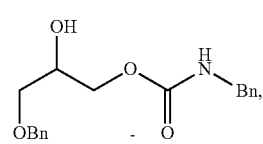

Formula 3 wherein Bn=Benzyl

TABLE 1

| | Amount of Acid (mol %)* | Type of Acid | Amount of Base (mol %)* | Type of Base | Reaction Time (min)** |
|---|---|---|---|---|---|
| Example 1 (THF solvent) | — | — | — | — | 1440 |
| Example 2 | 10 | LiOTf | — | — | 720 |

TABLE 1-continued

| | Amount of Acid (mol %)* | Type of Acid | Amount of Base (mol %)* | Type of Base | Reaction Time (min)** |
|---|---|---|---|---|---|
| Example 3 (THF solvent) | — | — | 40 | DBU | 840 |
| Example 4 | — | — | 40 | DBU | 120 |
| Example 5 | 10 | LiOTf | 10 | DBU | 75 |
| Example 6 | 20 | LiOTf | 40 | DBU | 35 |
| Example 7 | — | — | 10 | TBD | 30 |
| Example 8 | 10 | LiOTf | 10 | TBD | 10 |

*Mol % is determined relate to moles of amine groups in the reaction mixture
**Reaction time is measured as the amount of time to achieve >99% conversion Examples 1-8 are prepared using a catalyst system including LiOTf, LiCl, MgBr$_2$, DBU, and/or TBD (in amounts according to Table 1). The appropriate catalyst system is added to a 2 dram vial inside a glove box. Then, 1 eq of the Carbonate is mixed with the catalyst system and stirred for 10 min. Next, 1 eq of the Amine is added to the mixture including the Carbonate and the catalyst system and stirred until completion. The reaction is monitored by LC/LCMS is an analytical technique that combines the separation techniques of HPLC (high performance liquid chromatography) with mass spectrometry. Through the use of this method we can detect the formation of the carbamate/urethane and the disappearance of the cyclic carbonate until >99% consumption of the starting carbonate is achieved. The measure of >99% consumption of the starting carbonate is used as a metric for model compounds, but 99% consumption/conversion may not be needed for polymer systems. For example, for polymer systems a reaction rate may be an appropriate measure. Upon completion, the reaction mixture may be dissolved in a hexanes:dichloromethane mixture and purified by column chromatography.

Referring to Table 1, above, DBU may realize fast ring opening in neat reactions initiated at room temperature with high catalyst loading and in the absence of solvent (the reactions are exothermic, which can result in some temperature rise during a rapid reaction). For example, in Example 6 with LiOTf at 0.20 mol/mol amine (0.61 mol/L) and DBU at 0.40 mol/mol amine (1.22 mol/L), a stoichiometrically balanced reaction of benzyl glycerol carbonate and benzyl amine in the absence of solvent leads to full conversion (>99% reaction of functional groups) in 35 min. This compares to Example 1, which realizes a reaction time of 1440 min in the absence of both LiOTf and DBU, and also requires the use of a solvent THF (tetrahydrofuran) and Examples 3 and 4, which realizes a reaction time of 840 and 120 minutes, respectively, in the presence of DBU without LiOTf. When the catalyst system loading is decreased to lower levels, e.g., Example 5 that includes 0.10 mol/mol amine (0.36 mol/L) of each of LiOTf and DBU, a reaction time of 75 min for full conversion is realized.

Examples 7 and 8 include TBD in place of DBU. Referring to Example 7, the use of TBD alone at 0.10 mol/mol amine (0.37 mol/L) in the cyclic carbonate opening reaction realizes full conversion in 30 min, a better result than achieved by the dual catalysis system of LiOTf/DBU at similar concentrations of each component. Referring to Example 8, the combination of LiOTf and TBD, each at 0.10 mol/mol amine (0.36 mol/L), as a dual catalysis system realizes full conversion within 10 min of reaction initiated at room temperature.

Varied Carbonates and Amines

The utility of cooperative catalysis including TBD and LiOTf for increasing the speed and effectiveness of reactions between small-molecule cyclic carbonates and amines is shown in Table 1. Referring to Table 2, below, the effects of different substrates and amines (e.g., difunctional cyclic carbonate molecules and difunctional amines) on reaction time for >99% conversion of starting materials and the ratio of the following carbamates (a) and (b) is considered when using the cooperative catalysis including TBD and LiOTf. In particular, the following reaction is carried out in a manner similar to Example 7, in the presence of a cooperative catalyst system that includes 10 mol/mol amine of each of LiOTf and TBD, except $R^1$ and $R^2$ of the carbonate and $R^3$ of the amine are varied according to Table 2, below.

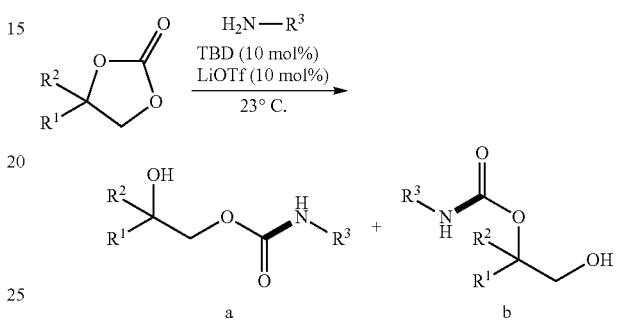

TABLE 2

| $R^1$ | $R^2$ | $R^3$ | Reaction Time (min)* | Ratio of a:b | % yield |
|---|---|---|---|---|---|
| CH$_2$OBn | Hydrogen | Benzyl | 10 | 4:1 | 80 |
| CH$_2$OBn | Hydrogen | Cyclohexane | 15 | 4:1 | 83 |
| CH$_2$OBn | Hydrogen | Hexane | 10 | 4:1 | 85 |
| Phenyl | Hydrogen | Benzyl | <3 | 3:1 | 92 |
| Phenyl | Hydrogen | Cyclohexane | <3 | 3:1 | 93 |
| Phenyl | Hydrogen | Hexane | <3 | 3:1 | 90 |
| Methyl | Phenyl | Benzyl | 3 | 1:0 | 85 |
| Methyl | Phenyl | Cyclohexane | 3 | 1:0 | 85 |
| Methyl | Phenyl | Hexane | 3 | 1:0 | 84 |
| Para-CF$_3$ phenyl | Hydrogen | Benzyl | 1 | 3.5:1 | 95 |
| Para-CF$_3$ phenyl | Hydrogen | Cyclohexane | 1 | 3.5:1 | 91 |
| Para-CF$_3$ phenyl | Hydrogen | Hexane | 1 | 3.5:1 | 90 |

** Reaction time is measured as the amount of time to achieve >99% conversion of the cyclic carbonate to carbamate structures a and b As shown above, the fastest reaction times are achieved with the electron-withdrawing para-CF$_3$ benzyl substituent. In addition, phenyl substituted carbonate offers similar reaction times, with the advantage of being easily obtained from abundantly available styrene oxide. Ratios of carbamate products a and b remained relatively unchanged when modifying the carbonate backbone or when altering the amines. A significant ratio difference is observed when utilizing di-substituted carbonate, which offered rapid reaction times and selective formation of the single carbamate product a.

Cyclic Carbonate Prepolymer

Isocyanate based polyurethane synthesis may include a reaction between a prepolymer consisting of a polyether diol (e.g., of a molecular weight between 600 and 2000 g/mol) and a polyisocyanate (e.g., methylene diphenyl diisocyanate and/or toluene diisocyanate). Similarly, a cyclic carbonate prepolymer may be formed as schematically shown below as Component 11:

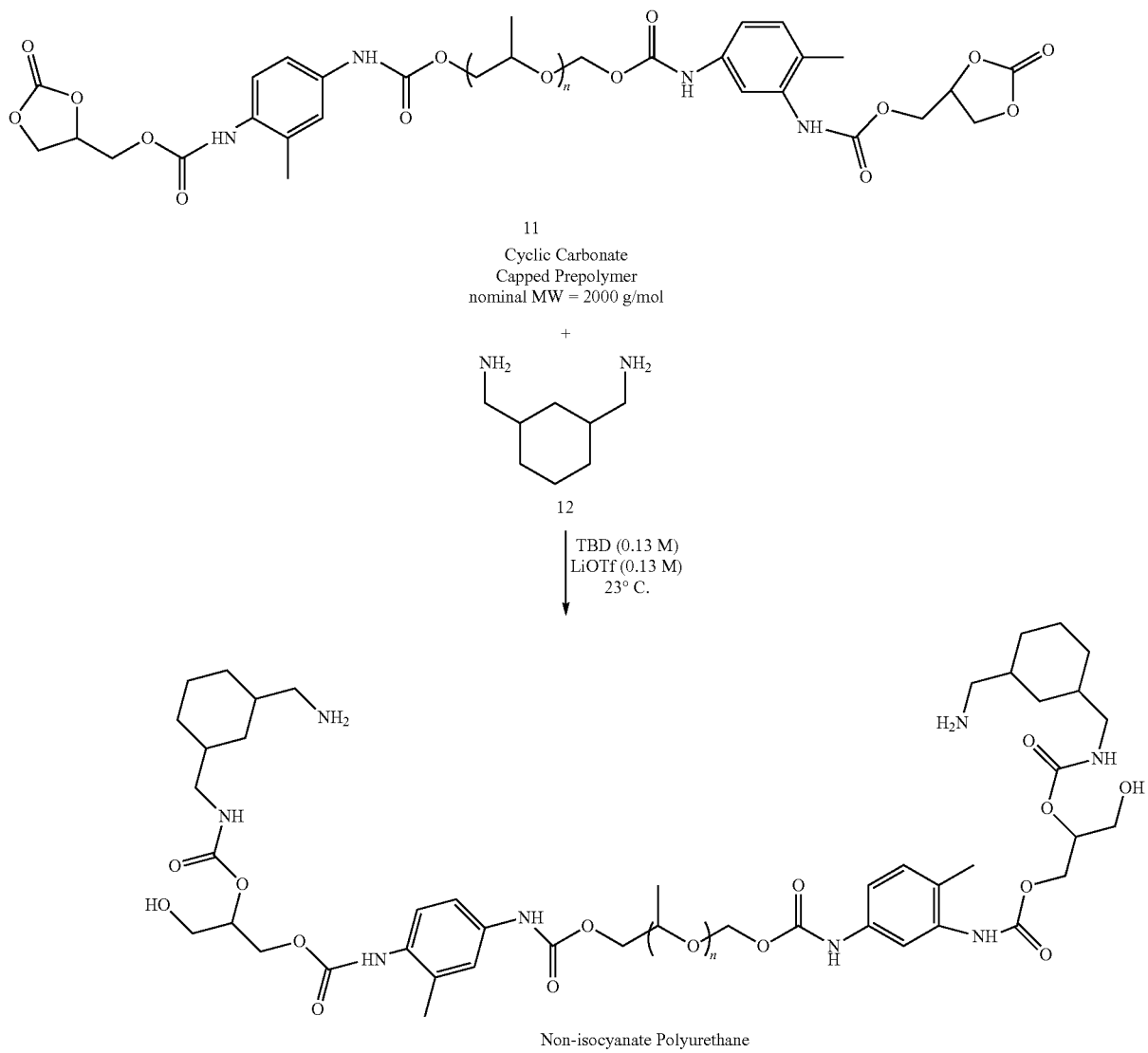

11
Cyclic Carbonate
Capped Prepolymer
nominal MW = 2000 g/mol

12

TBD (0.13 M)
LiOTf (0.13 M)
23° C.

Non-isocyanate Polyurethane

In particular, a commercial polyether diol (VORANOL™ 220-056N available from The Dow Chemical Company, having a nominal molecular weight of 2000 g/mol) is end-capped with glycerol carbonate, resulting in the polyether dicyclic carbonate shown above as Component 11. An exemplary procedure for pre-polymer synthesis includes 0.05 mole of Voranol 220-056N polyether diol (available from The Dow Chemical Company) is added to 0.17 mole of 2,4-toluene diisocyanate (available from Sigma-Aldrich) and 0.34 mmole of dibutyl tin dilaurate (available from SigmaAldrich) and stirred for 2 hr at 80° C. under nitrogen, 0.24 mole of glycerol 1,2-carbonate (TCI) is added to the reaction vessel, and a urethane-linked prepolymer end-capped with glycerol carbonate groups was formed after stirring for 2 hr. All reagents are dewatered using nitrogen and activated molecular sieves.

The resultant glycerol carbonate is mixed at stoichiometric balance with a diamine (i.e., 1,3-cyclohexane bis(methyl amine), which is component 12, above). The reaction is initiated at 23° C. Comparisons are made between reactions in the presence of a cooperative catalyst system that includes 0.10 mol/mol amine (0.133 mol/L) of each of TBD and LiOTf (premixed into the polyether dicyclic carbonate before the addition of the diamine) and in the absence of the cooperative catalyst system. The concentrations of TBD and LiOTf in the synthesis of the non-isocyanate based polyurethane are almost a factor of three lower (0.133 M compared to 0.290 M) than those present in the reactions of the small-molecule mono-functional cyclic carbonate and amine reactions described above. The amount of the cooperative catalyst system may be selected to provide suitable solubility in polymer, e.g., because when a catalyst system has limited solubility in polymer, large quantities of residual catalyst in the polymer may have deleterious effects on resultant properties and/or substantially increase cost.

Fractional Conversion

Figure 3:
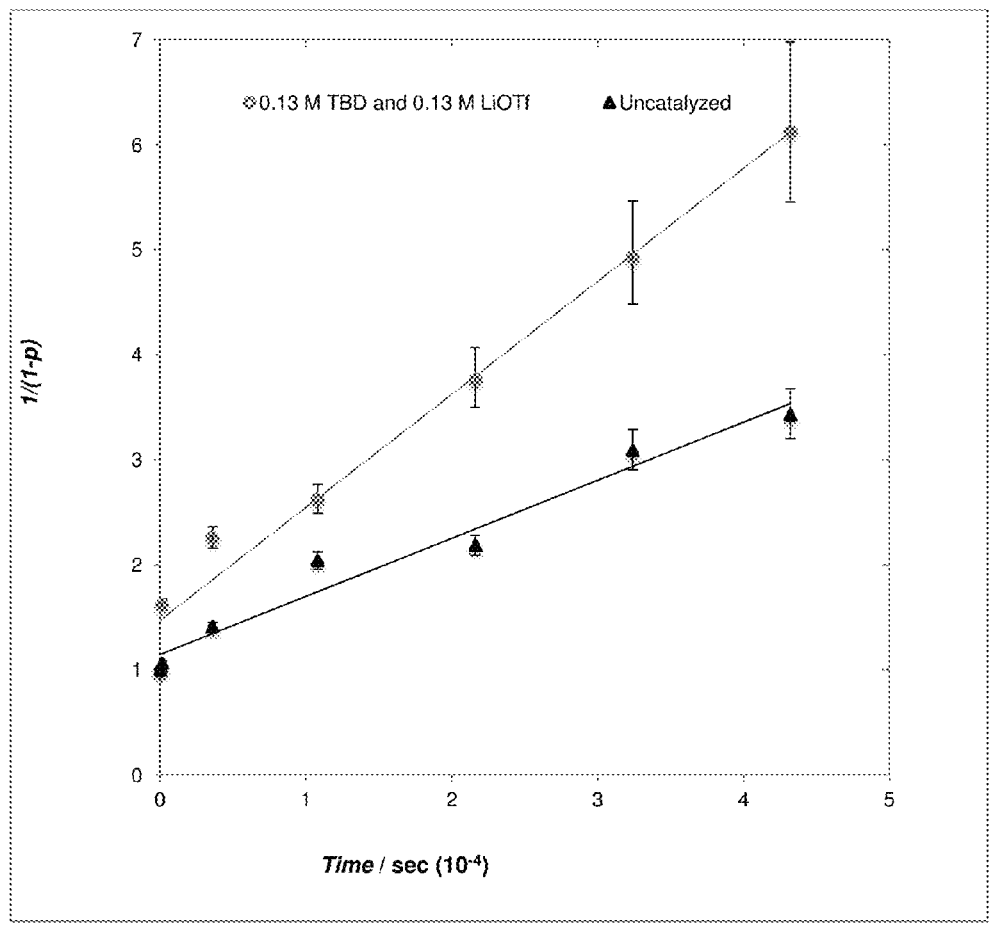
FIG. 3 illustrates a graphical representation of carbonate conversion fit to integrated second order rate equations for reactions in the presence and in the absence of a cooperative catalyst system.

Major differences in fractional conversion of functional groups, p (with $0 \leq p \leq 1$), are observed in the presence and absence of the cooperative catalyst system that includes TBD and LiOTf. Referring to FIG. 3, after 2 min, p=0.39 (39% conversion) with catalyst and 0.06 without catalyst. After 60 min, p=0.56 with catalyst and 0.30 without catalyst. A possible contributor to the extraordinary difference in fractional conversion after 2 min is a temperature rise resulting from the exothermic nature of the reaction, which would be greater in the faster reacting system. FIG. 3 illustrates that both the catalyzed and the uncatalyzed reactions provide acceptable fits to results expected for second-order reactions, i.e., first order in cyclic carbonate concentration and first order in amine concentration. Second-order reactions at stoichiometric balance are based on the following Equation 1:

$$co/c = 1 + k\,co\,t \qquad \text{Equation (1)}$$

Wherein co is the initial functional group concentration, c is the functional group concentration at reaction time t (seconds), and k is the second-order reaction rate parameter. With approximate linearity in co/c for both uncatalyzed and catalyzed reactions, the catalyzed reaction exhibits a k value that is about twice that of the uncatalyzed reaction. Calculated k values include: (1) $k_{uncat} = 4.0 \times 10^{-5}$ L mole$^{-1}$ sec$^{-1}$, and (2) $k_{cat} = 8.1 \times 10^{-5}$ L mole$^{-1}$ sec$^{-1}$ (with $c_{o,uncat} = 1.4$ M and $c_{o,cat} = 1.3$ M). The calculated Activation energies are the following: $Ea_{uncat}$ is 27 kJ/mol and $Ea_{cat}$ is 14 kJ/mol.

Without intending to be bound by this theory, the slower nature of the reaction observed with the synthesis of polymer, as compared with the reaction of small-molecule model compounds, may be based on both the functional groups and catalyst loading being at much lower concentrations at the outset of the polymer synthesis as compared with the reaction of the model small-molecule system. Nonetheless, the achievement of substantial conversion within minutes demonstrates the effectiveness of the cooperative catalyst system that includes TBD and LiOTf, in catalyzing the synthesis of non-isocyanate based polyurethanes at ambient temperature via the reaction of bis-cyclic carbonate with a diamine.

Glass Transition Temperature Comparison

Figure 4A:
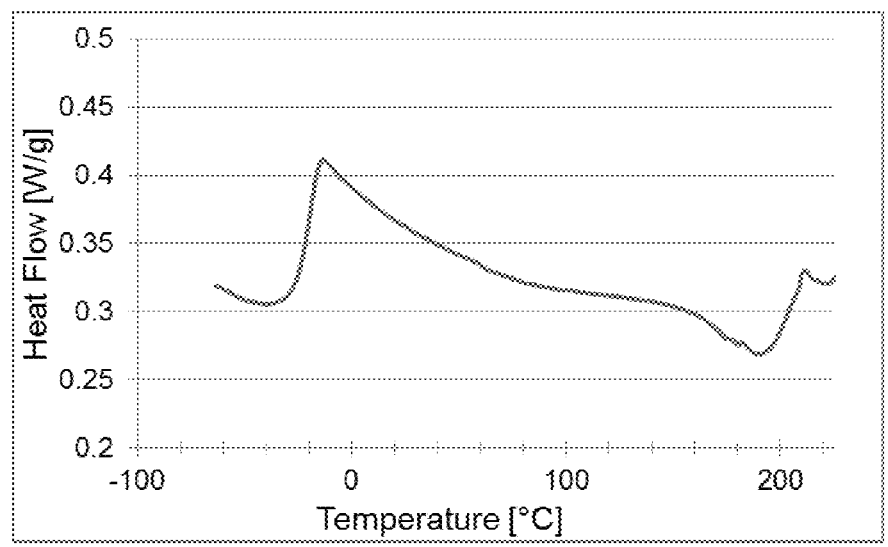
FIG. 4A and FIG. 4B illustrate graphical representations of glass transition temperature of the polyurethane elastomer forming according to the methods of FIG. 1 and FIG. 2, respectively.
Figure 4B:
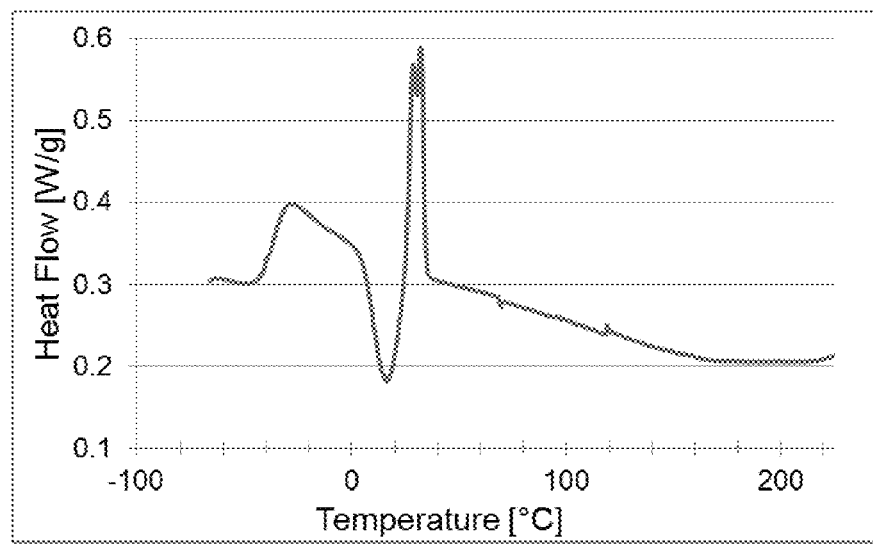

Referring to FIGS. 4A-4B, the glass transition temperature of the isocyanate based polyurethane prepared according to the method illustrated in FIG. 1 is compared to the glass transition temperature of the non-isocyanate based polyurethane (i.e., polyhydroxyurethane) prepared according to the method illustrated in FIG. 2. The isocyanate based polyurethane exhibits a soft-segment Tg (glass transition) at a temperature of −19° C. and a hard-segment Tg at a temperature of 211° C. The non-isocyanate based polyurethane exhibits a Tg at a temperature of −33° C. and a melt transition at a temperature of 37° C.

Figure 5A:
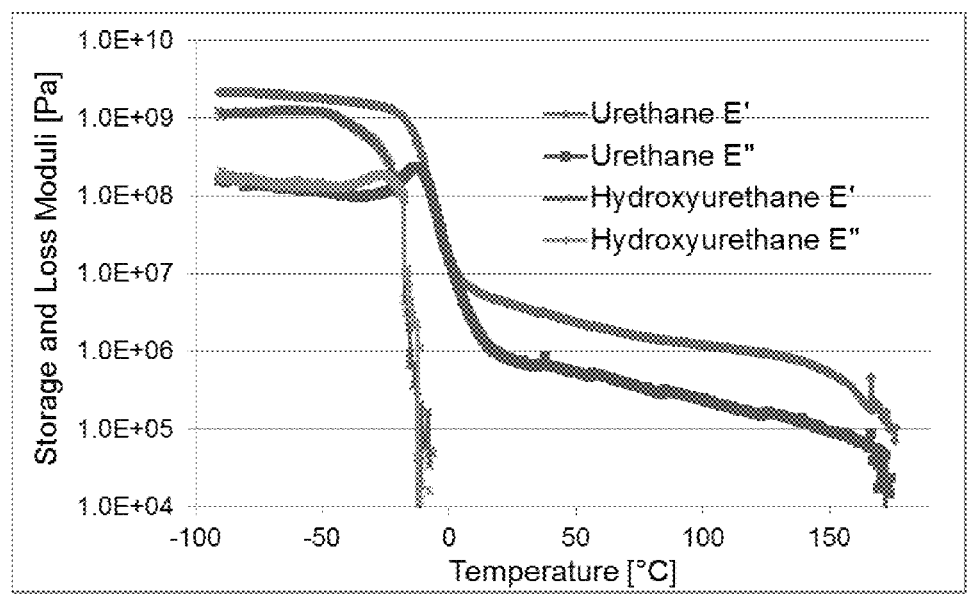
FIG. 5A and FIG. 5B illustrate graphical representations of dynamic mechanical analysis based on storage (E') and loss moduli (E'')
Figure 5B:
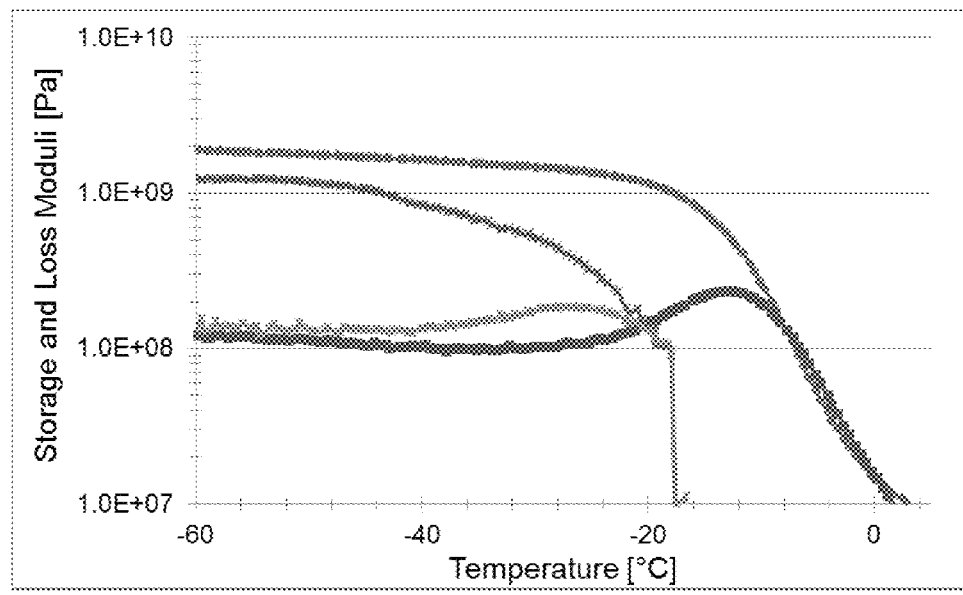

Referring to FIGS. 5A-5B, soft-segment Tg is determined by the maximum in the loss modulus. The dynamic mechanical analysis of FIGS. 5A-5B is based on dynamic temperature sweep in tensile geometry, −90° C. to 200° C. @ 3° C./min, 0.03% Strain, 10 Hz.

The invention claimed is:

1. A method for producing non-isocyanate based polyurethane, the method comprising:
providing a cyclic carbonate component, providing an amine component, and providing a cooperative catalyst component that performs cyclic carbonate ring opening and includes an oxyphilic Lewis acid and an organic Lewis base, the Lewis acid being a lithium salt that is lithium triflate or lithium tetrafluoroborate and the Lewis base being a cyclic amidine or a cyclic guanidine.

2. The method as claimed in claim 1, wherein the cooperative catalyst component includes a molar amount of the Lewis acid that is the same as or less than a molar amount of the Lewis base.

3. The method as claimed in claim 1, wherein the Lewis acid is present in an amount from 1 mol % to 50 mol %, based on the total moles of the Lewis acid per the total moles of amine functional groups in the amine component.

4. The method as claimed in claim 1, wherein the Lewis base is present in an amount from 1 mol % to 60 mol %, based on the total moles of the Lewis base per the total moles of amine functional groups in the amine component.

5. A cooperative catalyst component for forming a non-isocyanate based polyurethane polymer using a cyclic carbonate component and a amine component, the cooperative catalyst component comprising an oxyphilic acid and an organic Lewis base, the Lewis acid being a lithium salt that is lithium triflate or lithium tetrafluoroborate, and the Lewis base being a cyclic amidine or a cyclic guanidine.

6. A non-isocyanate based polyurethane polymer, comprising a urethane linkage that is the reaction product of a cyclic carbonate component and an amine component formed in the presence of a cooperative catalyst component that includes an oxyphilic Lewis acid and an organic Lewis base, the Lewis acid being a lithium salt that is lithium triflate or lithium tetrafluoroborate, and the Lewis base being a cyclic amidine or a cyclic guanidine.

* * * * *